United States Patent
Pan et al.

(10) Patent No.: US 7,875,204 B2
(45) Date of Patent: Jan. 25, 2011

(54) FLAME RETARDING POLYMER ELECTROLYTE COMPOSITION CONTAINING MALEIMIDES

(75) Inventors: Jing-Pin Pan, Hsinchu (TW); Chang-Rung Yang, Hsinchu (TW); Fu-Ming Wang, Hsinchu (TW); Jung-Mu Hsu, Hsinchu (TW); Yueh-Wei Lin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 667 days.

(21) Appl. No.: 11/889,817

(22) Filed: Aug. 16, 2007

(65) Prior Publication Data

US 2008/0176141 A1 Jul. 24, 2008

(30) Foreign Application Priority Data

Dec. 25, 2006 (TW) .............................. 95148696 A

(51) Int. Cl.
*H01M 10/0565* (2010.01)
(52) U.S. Cl. ................... 252/182.1; 252/62.2; 252/500; 252/511; 429/188; 429/189; 429/303; 429/304; 361/502; 361/503
(58) Field of Classification Search .............. 252/62.2, 252/500, 182.1; 429/188, 189, 303, 304, 429/319, 322, 324, 380, 338
See application file for complete search history.

(56) References Cited

U.S. PATENT DOCUMENTS

| 6,677,084 B1 * | 1/2004 | Matsui et al. ............... 429/317 |
| 7,560,194 B2 * | 7/2009 | Lin et al. .................... 429/303 |
| 2005/0053840 A1 * | 3/2005 | Jo et al. ...................... 429/247 |

FOREIGN PATENT DOCUMENTS

TW       I251361 B1        3/2006
WO    WO 2006/052082    *  5/2006

OTHER PUBLICATIONS

Office Action dated Oct. 21, 2010 for the corresponding Taiwanese Application.

* cited by examiner

*Primary Examiner*—Stanley Silverman
*Assistant Examiner*—Kallambella Vijayakumar
(74) *Attorney, Agent, or Firm*—Birch, Stewart, Kolasch & Birch, LLP

(57) ABSTRACT

A flame retarding polymer electrolyte composition containing maleimides includes a modified maleimide; a lithium salt; and at least one ionic solution in a ratio of at least 2 wt % relative to the total weight of the composition. By using the hyperbranched dendrimer-like structure of the modified maleimide as grafted skeleton for polymer electrolytes, the electrolyte composition can encapsulate an electrolytic solution continuously, thus preventing the exudation of the electrolytic solution and increasing the stability of lithium ionic conduction. Since the ionic solution is nonflammable, the safety of batteries are further enhanced when the polymer electrolyte composition is used as polymer electrolyte for a lithium secondary battery.

19 Claims, 1 Drawing Sheet

FLAME RETARDING POLYMER ELECTROLYTE COMPOSITION CONTAINING MALEIMIDES

FIELD OF THE INVENTION

The present invention relates to polymer electrolyte compositions. In particular, the present invention relates to a flame retarding polymer electrolyte composition.

BACKGROUND OF THE INVENTION

With the trend toward size and weight reduction in portable electronic devices, lithium secondary batteries have been increasingly used and developed as power supplies in these appliances. As for lithium secondary battery, however, excessively repeated charge and discharge, unfavorable short circuit and operation under high current for long time will release quantities of heat, and consequently, may lead to flammable components of electrolyte in a battery to burn, thermal breakdown or even explosion of a battery. Therefore, the safety of batteries are considered, especially when they are applied in electric automobiles. One critical approach to improve the safety of lithium secondary batteries is to enhance the thermal stability of materials for batteries.

By adding flame retarding components to a flammable organic electrolyte in a lithium ion battery, the thermal stability of electrolytic solution can be increased, thereby allowing the electrolytic solution to be flame retarding or nonflammable. As a result, battery burning or explosion is sufficiently prevented when the battery is worked under a condition of overheating. Organic phosphorus-based compounds are usually used as flame retarding components in electrolytes for lithium ion batteries. For example, alkyl phosphates such as trimethyl phosphate (TMP) and triethyl phosphate (TEP); phosphazenes such as hexamethyl phosphazene; compounds with phosphorus substituents; and compounds with phosphorus-nitrogen bonding can be mentioned and they are all excellent flame retardants. Nevertheless, most of the organic phosphorus-containing flame retardants have inferior electrochemical stability, so reductive degradation may easily occur on the surface of a carbonaceous negative electrode. Moreover, phosphorus-containing flame retardants have higher viscosity, resulting in adverse effects on the conductivity of electrolytes, such that the development of lithium-ion battery is restrained.

On the other hand, organic fluorinated compounds, i.e., hydrogen atoms thereof are substituted by fluorine atoms, are favorable to reduction in flammability of solvents for lithium ion batteries because of fewer hydrogen atoms contained on the solvent molecule. Fluorinated alkyl phosphates such as [tris-(2,2,2-trifluoroethyl)]phosphate (TFP) and [bis-(2,2,2-trifluoroethyl)]methylphosphate (BMP) have a retarding effect on the flammability and their electrochemical stability are improved by fluoro groups. However, these halogen-containing additives will produce toxic compounds when they are recollected and burned, thus harmful to environments.

Therefore, it is desired that there is a polymer electrolyte composition having properties of excellent conductivity and flame retardation as well as harmless to environments.

To overcome the above-mentioned problems, the present invention has been completed after the present inventors studied intensively and made improvement.

SUMMARY OF THE INVENTION

It is a primary objective of the present invention to provide a polymer electrolyte composition exhibiting excellent flame retardation.

It is another objective of the present invention to provide a polymer electrolyte composition preventing leakage of electrolytic solution.

It is a further objective of the present invention to provide a polymer electrolyte composition improving stability of lithium ion conduction.

To achieve the above-mentioned and other objectives, a flame retarding polymer electrolyte composition containing maleimides is provided in the present invention, comprising a modified maleimide; a lithium salt; and at least one ionic solution added in a ratio of at least 2 wt % relative to the total weight of the composition. By using the hyperbranched dendrimer-like structure of the modified maleimide as grafted skeleton for polymer electrolytes, the electrolyte composition can encapsulate an electrolytic solution continuously, thus preventing the exudation of the electrolytic solution and increasing the stability of lithium ionic conduction. Since the ionic solution is nonflammable, the safety of batteries are further enhanced when the polymer electrolyte composition is used as a polymer electrolyte for a lithium secondary battery.

DETAILED DESCRIPTIONS OF THE PREFERRED EMBODIMENTS

Figure 1:
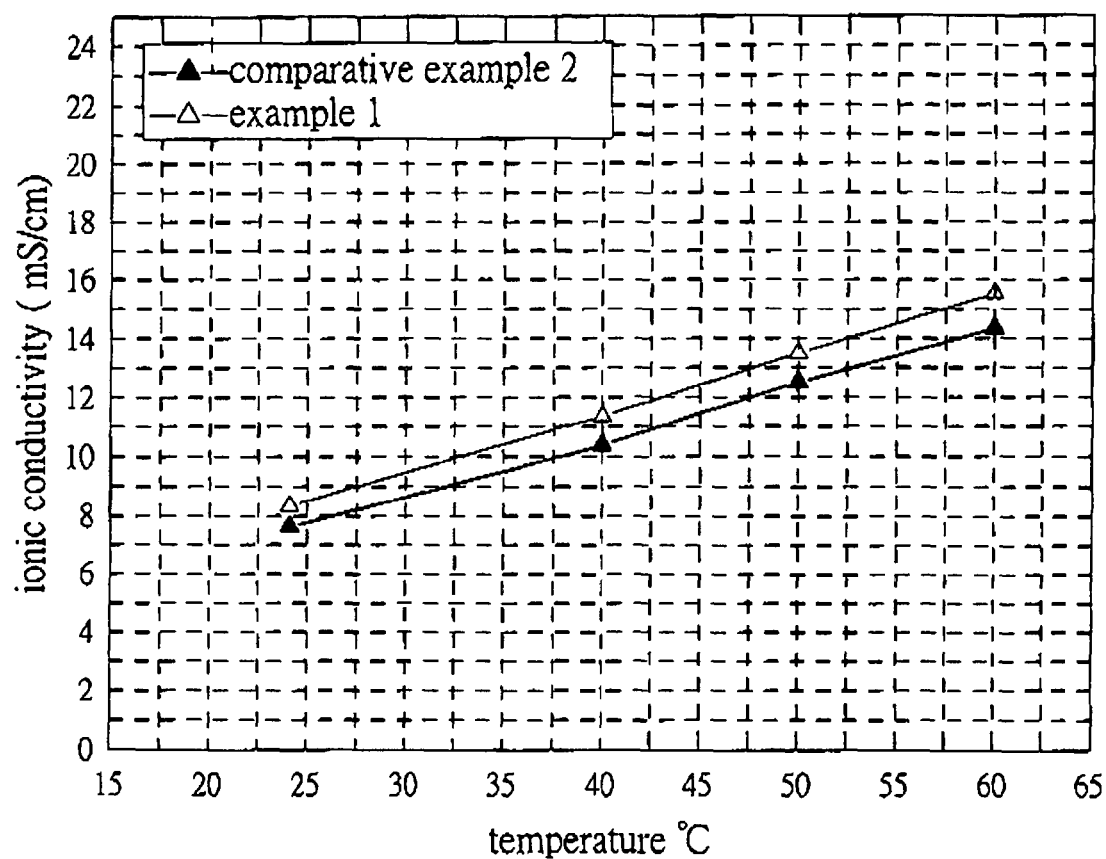
FIG. 1 is a graph shown the ionic conductivity of the electrolyte compositions of example 1 and comparative example 2 at different temperatures.

The flame retarding polymer electrolyte composition containing maleimide in the present invention comprises a modified maleimide; a lithium salt; and at least one ionic solution added in a ratio of at least 2 wt % relative to the total weight of the composition. In the electrolyte composition, the modified maleimide is formed by reacting bismaleimide (BMI) or maleimide with barbituric acid (BTA), represented by formula (I), or derivatives thereof:

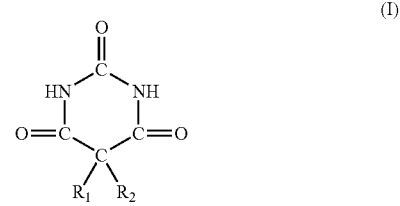

(I)

wherein $R_1$ and $R_2$ each independently represent —H, —$CH_3$, —$C_2H_5$, —$C_6H_5$, —$CH(CH_3)_2$, —$CH_2CH(CH_3)_2$, —$CH_2CH_2CH(CH_3)_2$, or —$CH(CH_3)$—$(CH_2)_2$—$CH_3$).

In one embodiment, bismaleimide represented by formula (II) is applied:

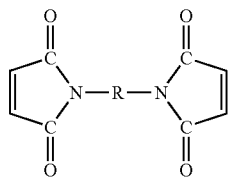

(II)

wherein R is aryl group, aliphatic group, cyclic aliphatic group, or aliphatic with silyl group. Examples of bismaleimides include, but not limited to, N,N'-ethylene-bismaleimide, N,N'-butylene-bismaleimide, N,N'-hexamethylene-bismaleimide, N,N'-phenylene-bismaleimide, N,N'-4,4'-diphenylmethane-bismaleimide, N,N'-4,4'-diphenyl ether-bismaleimide, N,N'-4,4'-diphenyl sulfone-bismaleimide, N,N'-4,4'-dicyclohexylmethane-bismaleimide, N,N'-phenyldimethyl-bismaleimide, and N,N'-diphenylcyclohexane-bismaleimide.

In the embodiment, barbituric acid reacts with bismaleimide at a molar ratio of from 1:1 to 1:20, and preferably at a molar ratio of from 1:3 to 1:10. The reaction is usually performed at 100-130° C. for 0.5-6 hr to give bismaleimide modified by barbituric acid. The modified bismaleimide has a hyperbranched dendrimer-like structure and can be used as grafted skeleton for the polymer electrolyte composition of the present invention. This grafted skeleton can encapsulate electrolytic solution continuously, thus preventing the exudation of the electrolytic solution and enhancing the stability of lithium ionic conduction in the electrolyte composition. Furthermore, monomers with flexible chains can be added in order to improve the flexibility of the modified maleimide. The amount of the modified maleimide in the present flame retarding polymer electrolyte composition containing maleimide is 1 to 30 wt % based on the total weight of the composition, and preferably 5 to 20 wt % based on the total weight of the composition.

Examples of lithium salts in the present electrolyte composition include, but not limited to, $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)$, and $LiCF_3SO_3$. Generally, for the sake of conductive efficacy and cost, $LiPF_6$ is preferred. One the other hand, when the property of flame retardation is considered, the $LiBF_4$ is preferred. By adjusting the content of lithium salts in the present electrolyte composition, the required conductivity can be attained. By adding more lithium salts into the electrolyte composition to heighten the concentration of lithium ions, the conductivity of the electrolyte composition is increased. However, the high content of lithium salts will interfere ionic conduction of polymer chains, leading to reduction in conductivity. In one embodiment, the content of lithium salt in the present electrolyte composition is 2 to 30 wt % based on the total weight of the composition, and preferably 5 to 20 wt % based on the total weight of the composition.

Owing to the properties of low melting point, low volatility and good solubility as well as the advantages of high polarity, thermal stability and flame retardation, ionic solution can be used in a polymer electrolyte composition to improve flame retardation of the polymer electrolyte composition without affecting the conductivity of an electrolytic solution. The present polymer electrolyte composition comprises at least one ionic solution, wherein the ionic solution consists of organic cations and inorganic anions. Examples of the organic cations include, but not limited to, imidazolium, pyridinium, ammonium, and phosphonium. Examples of the inorganic anions include, but not limited to, $AlCl_4^-$, $BF_4^-$, $PF_4^-$, $CF_3COO^-$, $CF_3SO_3^-$, $(CF_3SO_2)_2N^-$, $SbF_6^-$, $Cl^-$, $Br^-$, $I^-$, $NO_3^-$, and $ClO_4^-$. Preferably, the ionic solution consists of tertiary or quarternary ammonium salts or mixtures thereof. The ionic solution in the present electrolyte composition can be used as additives or cosolvents and added in a ratio of at least 2 to 50 wt % relative to the total weight of the composition, and preferably 2 to 40 wt % relative to the total weight of the composition, thereby improving flame retardation of the electrolyte composition.

The polymer electrolyte composition of the present invention can further comprise organic solvent. Examples of the organic solvent include, but not limited to, propylene carbonate (PC), ethylene carbonate (EC), γ-butyrolactone (GBL), propyl acetate (PA), diethyl carbonate (DEC), dimethyl carbonate (DMC), ethylmethyl carbonate (EMC), and combinations thereof. It is preferred that the organic solvent is selected from propylene carbonate, ethylene carbonate, diethyl carbonate, or combinations thereof. In one embodiment, one or more organic solvents are used as solvent in the present electrolyte composition, and the ionic solution is used as additive in a ratio of at least 2 wt % relative to the total weight of the composition. The dosage of the ionic solution is not restricted, and preferably in a ratio of at least 2 to 50 wt % relative to the total weight of the composition. In another embodiment, single or mixed organic solvent is used as a first solvent in the present electrolyte composition, while ionic solution is used as a second solvent. The solvent in the present electrolyte composition is used in a ratio of 30 to 98 wt % based on the total weight of the composition, and preferably 50 to 95 wt % based on the total weight of the composition.

The present electrolyte composition can further comprise polymers of acrylate or other polymers. In one embodiment, the content of the polymer is in a range of from 0 to 10 wt % based on the total weight of the composition. Additionally, the present electrolyte composition can include additives: vinylidene carbonate (VC) or oxides such as $SiO_2$, $TiO_2$, to improve surface character of electrodes; or initiators such as dibenzoyl peroxide (BPO), di(4-tert-butylcyclohexyl) peroxydicarbonate (BCHPC), azobisisobutyronitril (AIBN). These additives are used in a ratio of 0 to 3 wt % based on the total weight of the composition.

The present polymer electrolyte composition has advantages of flame retardation and preventing from liquid leakage, and is suitable used for lithium secondary battery. As for positive electrodes of lithium secondary batteries, they can be made by dissolving 80 to 95% of active positive electrode materials, 3 to 15% of conductive additives, and 3 to 10% of fluorine based resin adhesives into N-methyl-2-pyrrolidone (NMP) to produce paste for positive electrodes. The paste is coated uniformly on an aluminum foil roll (300 m in length× 35 cm in width×20 μm in thickness) and dried. The foil roll is ground and cut, and then dried at 110° C. for 4 hr under vacuum to give positive electrodes. Examples of the active positive electrode materials include lithium oxides, lithium sulfides, lithium selenides, and lithium tellurides of vanadium, titanium, chromium, copper, molybdenum, niobium, iron, nickel, cobalt, and manganese. Examples of the fluorine based resin adhesives include, but not limited to, poly(vinylidene fluoride) (PVDF). Examples of the conductive additives include carbon black, graphite, acetylene black, powdery nickel, aluminum, titanium, stainless steel, and the like.

As for negative electrodes of lithium secondary batteries, they can be made by dissolving 90% of active negative electrode materials with a diameter of 1 to 30 μm, and 3 to 10% of fluorine based resin adhesives into N-methyl-2-pyrrolidone (NMP), then mixed and coated uniformly on an aluminum foil roll (300 m in length×35 cm in width×10 μm in thickness). The foil roll is ground and cut, and dried at 110° C. for 4 hr under vacuum to give negative electrodes. Examples of the active negative electrode materials include mesophase carbon micro beads (MCMB), vapor-grown carbon fiber (VGCF), carbon nanotube (CNT), charcoal, carbon black, graphite, acetylene black, carbon fiber, and glassy carbon. The fluorine based resin adhesive can be poly(vinylidene fluoride).

The character and efficacy of the present invention will be further described in details by referring to the following examples.

EXAMPLES

Synthesis 1: Preparation of Modified Maleimide

Dissolving N,N'-4,4'-diphenylmethane-bismaleimide (8.66 g) into propylene carbonate (20 g), then barbituric acid (1 g) was added and stirred at 130° C. for 6-9 hr to form bismaleimed modified by barbituric acid (MBMI).

Example 1

MBMI obtained in synthesis 1 (6 g) and lithium salt LiPF$_6$ (6.6 g) were charged in a flask, and then an organic electrolyte (1.1M LiPF$_6$ in a mixed solvent of EC, PC and DEC with a volume ratio of EC/PC/DEC=3/2/5) was added. After MBMI and LiPF$_6$ dissolved to form clear yellow solution, 2 wt % of ionic solution 1-ethyl-3-methylimidazolium trifluoromethanesulfonate and initiator BCHPC (0.12 g) were added in turn. The mixture was shaken to produce electrolyte 1.

Comparative Example 1

MBMI obtained in synthesis 1 (6 g) and lithium salt LiPF$_6$ (6.6 g) were charged in a flask, and then an organic electrolyte (1.1M LiPF$_6$ in a mixed solvent of EC, PC and DEC with a volume ratio of EC/PC/DEC=3/2/5) was added. After MBMI and LiPF$_6$ dissolved to form clear yellow solution, 1 wt % of ionic solution 1-ethyl-3-methylimidazolium trifluoromethanesulfonate and initiator BCHPC (0.12 g) were added in turn. The mixture was shaken to produce electrolyte 2.

Comparative Example 2

MBMI obtained in synthesis 1 (6 g) and lithium salt LiPF$_6$ (6.6 g) were charged in a flask, and then an organic electrolyte (1.1M LiPF$_6$ in a mixed solvent of EC, PC and DEC with a volume ratio of EC/PC/DEC=3/2/5) was added. After MBMI and LiPF$_6$ dissolved to form clear yellow solution, initiator BCHPC (0.12 g) was added. The mixture was shaken to produce electrolyte 3.

Three incubation plates were used. Electrolyte 1, 2 and 3 (15 ml each) were separately filled into these incubation plates and heated at 70° C. under vacuum. After 1 hr, gel electrolyte composition A, B and C were formed. A burning test for these electrolyte compositions were performed and the results are showed in Table 1:

TABLE 1

| | Results of burning test | | |
|---|---|---|---|
| | Electrolyte composition A | Electrolyte composition B | Electrolyte composition C |
| Burning test | ○ | X | X |

○ represent passed: ignitable and extinct automatically after 10 seconds.
X represent not passed: ignitable and burning continuously.

The ionic conductivity of the electrolyte composition A and C obtained in example 1 and comparative example 2 respectively was measured at 25, 40, 50 and 60° C. As FIG. 1 showed, the present electrolyte composition still has superior ionic conductivity after adding ionic solution. Moreover, the present electrolyte composition exhibits flame retardation and the safety of batteries can be improved if it is used as polymer electrolyte of lithium secondary batteries.

The foregoing examples merely illustrate the features and functions of the present invention and do not restrict the scope of the present invention. Modifications and variations may be made without departing from the spirit and principle of the present invention to those skilled in the art. The scope of the present invention is defined by the appended claims.

What is claimed is:

1. A flame retarding polymer electrolyte composition containing maleimides, comprising:
    a bismaleimide reacted with barbituric acid;
    a lithium salt, in a ratio of 2 to 30 wt % based on a total weight of the composition; and
    at least one ionic solution, added in a ratio of at least 2 wt % relative to the total weight of the composition.

2. The composition of claim 1, wherein a molar ratio of the barbituric acid to the bismaleimide is from 1:1 to 1:20.

3. The composition of claim 1, wherein a molar ratio of the barbituric acid to the bismaleimide is from 1:3 to 1:10.

4. The composition of claim 1, wherein the bismaleimide is in a ratio of 1 to 30 wt % based on the total weight of the composition.

5. The composition of claim 1, wherein the lithium salt is selected from the group consisting of LiPF$_6$, LiBF$_4$, LiAsF$_6$, LiSbF$_6$, LiClO$_4$, LiACl$_4$, LiGaCl$_4$, LiNO$_3$, LiC(SO$_2$CF$_3$)$_3$, LiN(SO$_2$CF$_3$), LiSCN, LiN(SO$_2$CF$_3$)$_2$, LiO$_3$SCF$_2$CF$_3$, LiC$_6$F$_5$SO$_3$, LiO$_2$CCF$_3$, LiSO$_3$F, LiB(C$_6$H$_5$), and LiCF$_3$SO$_3$.

6. The composition of claim 1, wherein the lithium salt is LiPF$_6$.

7. The composition of claim 1, wherein the lithium salt is LiBF$_4$.

8. The composition of claim 1, wherein the lithium salt is in a ratio of 5 to 20 wt % based on the total weight of the composition.

9. The composition of claim 1, wherein the ionic solution is composed of organic cations and inorganic anions.

10. The composition of claim 9, wherein the organic cation is selected from the group consisting of imidazolium, pyridinium, ammonium, and phosphonium.

11. The composition of claim 9, wherein the inorganic anion is selected from the group consisting of AlCl$_4^-$, BF$_4^-$, PF$_6^-$, CF$_3$COO$^-$, CF$_3$SO$_3^-$, (CF$_3$SO$_2$)$_2$N$^-$, SbF$_6^-$, Cl$^-$, Br$^-$, I$^-$, NO$_3^-$, and ClO$_4^-$.

12. The composition of claim 1, wherein the composition further comprises organic solvent.

13. The composition of claim 12, wherein the organic solvent is selected from the group consisting of propylene carbonate, ethylene carbonate, γ-butyrolactone, propyl acetate, diethyl carbonate, dimethyl carbonate, ethylmethyl carbonate, and combinations thereof.

14. The composition of claim 12, wherein the organic solvent is selected from the group consisting of propylene carbonate, ethylene carbonate, diethyl carbonate, and combinations thereof.

15. The composition of claim 12, wherein the organic solvent is in a ratio of 30 to 98 wt % based on the total weight of the composition.

16. The composition of claim 1, wherein the composition further comprises vinylidene carbonate additive.

17. The composition of claim 1, wherein the composition further comprises oxides additives selected from $SiO_2$.

18. The composition of claim 1, wherein the composition further comprises oxides additives selected from $TiO_2$.

19. The composition of claim 1, wherein the composition further comprises polymers of acrylate.

* * * * *